United States Patent Office 3,283,293
Patented Nov. 1, 1966

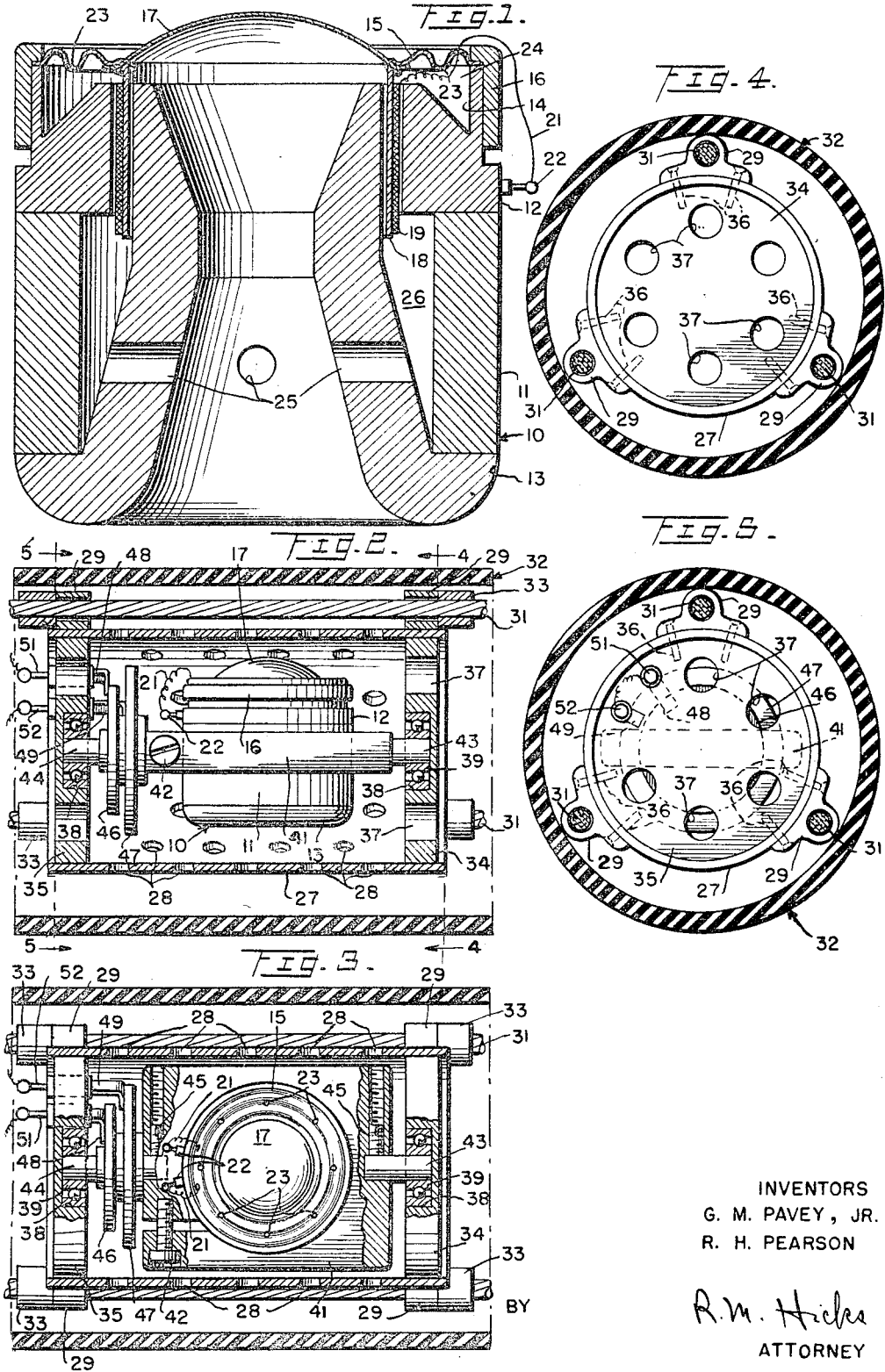

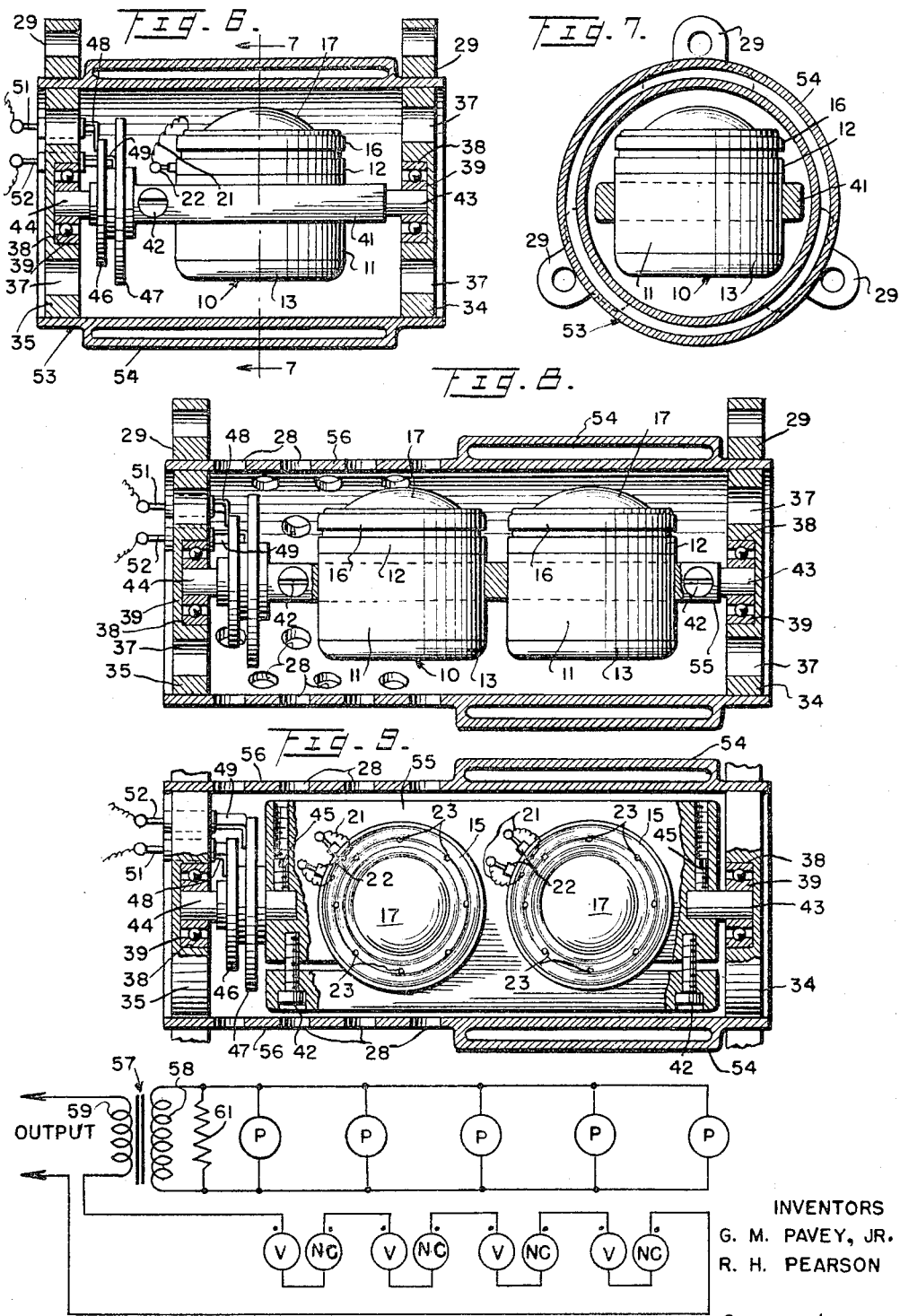

3,283,293
PARTICLE VELOCITY DETECTOR AND MEANS FOR CANCELING THE EFFECTS OF MOTIONAL DISTURBANCES APPLIED THERETO
George M. Pavey, Jr., Dallas, and Raymond H. Pearson, Richardson, Tex., assignors to Sonic Engineering Company, Dallas, Tex.
Original application Feb. 13, 1964, Ser. No. 344,670. Divided and this application Apr. 2, 1964, Ser. No. 356,867
6 Claims. (Cl. 340—7)

This is a divisional application of our application for Method and Underwater Detector Streamer Apparatus for Improving the Fidelity of Recorded Seismic Signals, Serial No. 344,670, filed February 13, 1964.

This invention relates to an acoustic detecting device and more particularly to a particle velocity detector or transducer for sensing seismic signals when employed in a system for surveying subsurface geological formations in water covered areas.

It has been the usual practice, heretofore, in modern systems of this character such, for example, as the system for Method and Means for Surveying Geological Formations disclosed and claimed in Patent 2,465,696, issued March 29, 1949, to Le Roy C. Paslay, to receive the seismic signals by a plurality of pressure responsive detectors disposed within a streamer and towed through the water by a vessel. While such a system has been generally satisfactory in service, it also receives secondary signals reflected from the surface of the water as the result of a mismatch of acoustical impedance at the air-water interface which may distort and otherwise adversely affect the seismic signals received by the detectors from the subsurface terrestrial structure from which the seismic signals are reflected. Since the pressure wave undergoes a 180 degree phase shift when reflected at the air-water interface nearly total cancellation of the seismic signal may result if the streamer is towed too near the surface. This condition has made it necessary heretofore for pressure detecting streamers to be operated at substantially a predetermined depth below the surface such, for example, as thirty feet for optimum results. This depth corresponds to one-quarter wavelength of the seismic signal. Variations in the depth of the streamer from this predetermined depth, however, are accompanied by a deterioration of the recorded seismic signal caused by the effects of the secondary wave reflection from the surface of the water. In practice, it has been found that the streamer depth does not remain constant throughout the length thereof due to oil leaks in the streamer, temperature variations, speed fluctuations and other causes, particularly when, as is sometimes the case, the length of the streamer is in excess of 2700 feet from the head to the tail end.

An additional disadvantage resides in the fact that whenever the character of the signal changes from location to location corresponding to different shot points, the timing of the signal also changes. To measure time on the signal recording chart it is necessary that there be a consistent correlation of signals from location to location of the streamer as the explosive shots are fired in successive order. An accurate measure of these times and either assumed or known propagation velocities is essential to the preparation of an accurate map of the subbottom strata surveyed by the streamer. The downwardly reflected secondary signals have, in certain cases, seriously impaired the seismic signals detected by the pressure type detectors to such an extent that the seismologist has experienced considerable difficulty in recognizing and interpreting the recorded graphs of thte seismic signals.

In accordance with the teaching of the present invention the detection streamer is provided with a plurality of particle velocity sensing detectors or phones arranged within the streamer and interspersed with the pressure detector phones disposed therein, the electrical outputs of the velocity and pressure phones being connected in such a manner that the character of the seismic signal reflected from the subbottom strata and received by the pressure phones is not adversely affected by the reflected secondary wave from the air-water interface. The invention also contemplates a second group of velocity sensitive phones within the streamer electrically connected to the particle velocity responsive phones in a manner to cancel out unwanted signals due to motional disturbances generated by residual inertia effects.

An arrangement is thus provided in which the character of the recorded seismic wave corresponding to the signal reflected from the subbottom strata upwardly toward the submerged streamer is unaltered by the signal reflected downwardly toward the streamer from the air-water interface and, if desired, noise effects from unwanted motional causes are eliminated. The manner in which this desirable result is achieved will be more clearly apparent as the description proceeds.

The particle velocity sensing detectors of the present invention are each characterized by an unsprung magnetic system of relatively high inertia and a sprung coil system movable at the particle velocity of the surrounding medium and possessing the characteristic of relatively low mechanical impedance, both systems being in contact with the medium and the movable coil system being constructed and arranged to be actuated selectively in opposite directions by impulses applied selectively by the medium to opposite sides of a dome shaped diaphragm to which the coil is secured.

One of the objects of the present invention is to provide a particle velocity sensing transducer having new and improved means for increasing the signal to noise ratio.

Another object is to provide a new and improved particle velocity sensing transducer comprising a high inertial magnetic system and a moving coil system of relatively low mechanical impedance cooperative therewith and responsive to particle velocity of an acoustic pressure wave applied selectively in either of two opposite directions to the moving coil system.

Still another object is to provide a new and improved particle velocity transducer comprising an unsprung magnetic system and a sprung moving coil diaphragm system of relatively low mechanical impedance cooperative therewith both sides of the diaphragm being in communication with the signal transmitting fluid medium responsive to the particle velocity of a pressure wave applied by the signal transmitting medium to either side of the diaphragm selectively in accordance with the direction of propagation of the signal wave.

A further object is to provide a gimbal mounted particle velocity sensing transducer assembly immersible within a wave transmitting fluid and comprising a magnetic system and a moving coil system of relatively low mechanical impedance responsive to an acoustic wave applied selectively thereto in either of two opposite directions and having new and improved means for rendering the transducer ineffective to generate electrical signals other than those caused by said acoustic wave.

A still further object resides in a new and improved particle velocity responsive transducer disposed within an oil filled detection streamer submersible at different depths within the water and having means for canceling the inertia effects on the particle velocity transducer resulting from unwanted motional disturbance of the streamer.

Still other objects, advantages and improvements will be apparent from a consideration of the following description, taken in connection with the following drawings of which:

FIG. 1 is an enlarged view in section of the device of the present invention in accordance with a preferred embodiment thereof;

FIG. 2 is a central longitudinal elevational view partially in section of the device of FIG. 1 and the mounting therefor within a streamer;

FIG. 3 is a plan view partially broken away of the device of FIG. 2;

FIG. 4 is a view taken along the line 4—4 of FIG. 2;

FIG. 5 is a view taken substantially along the line 5—5 of FIG. 2;

FIG. 6 is a view similar to FIG. 2 according to an alternative form of the invention;

FIG. 7 is a sectional view taken substantially on the line 7—7 of FIG. 6;

FIG. 8 is an elevational view and partially in section of the device according to still another alternative form thereof;

FIG. 9 is a plan sectional view partially broken away of the device of FIG. 8; and FIG. 10 is a circuit diagram suitable for use with the present invention.

Referring now to the drawings on which like numerals of reference are employed to designate like parts throughout the several views and more particularly to FIG. 1 thereof, there is shown thereon a particle velocity detecting or motion sensing unit generally indicated by the numeral 10 and comprising a magnet assembly composed of an annular magnet 11 having a circular upper pole piece 12 and a hollow lower pole piece 13 configured substantially as shown and secured to the ends of the magnet in any suitable manner to provide a small annular air gap therebetween. The upper pole piece is provided with an annular upwardly projecting lip 14 to which is secured an annular flexible compliance member 15 in any suitable manner as by the clamping ring 16. Secured to the ring member 16 at the inner annular portion thereof is a thin rigid dome-like member 17 composed preferably of cloth and treated with a phenolic resin sufficiently to impart the desired degree of stiffness thereto.

There is also secured to the dome member along a peripheral portion thereof a cylindrical tube 18 composed preferably of paper of .003″ to .005″ in thickness treated with a stiffener and carrying a wire coil or winding 19 wrapped thereabout and cemented thereto.

The coil is connected by a pair of flexible conductors 21 to a pair of terminals 22 for establishing an exterior electrical connection to the coil.

An arrangement is thus provided whereby the coil is adapted to be moved vertically within the magnetic air gap in response to particle movement of the medium acting on opposite sides of the diaphragm, this movement preferably being facilitated by a plurality of perforations 23 arranged annularly within the compliance member 15. The perforations 23 also serve an additional function of venting chamber 24 as the diaphragm is moved. The bottom pole piece 13 is provided with a relatively large aperture extending radially therethrough whereby the diaphragm is responsive to waves approaching from either above or below. A plurality of bores 25 are formed within the bottom pole piece transversely in communication with this large aperture to equalize the pressure within chamber 26 with the pressure of the medium within the aperture.

The structure for mounting the unit 10 and maintaining it in a vertical position comprises a tubular casing 27, FIG. 2, perforated as at 28 and provided with a plurality of outstanding ears 29 having holes therein within which the strain cables 31 extending throughout the length of the flexible oil filled streamer 32 are disposed. The casing is prevented from axial movement along the strain cables by a plurality of sleeves 33 swaged or otherwise secured to the strain cables. The oil filled streamer 32 and strain cables 31 are shown and described in greater detail in application Serial No. 344,670 of which this application is a division and in which a sufficient number of float members are disposed at intervals interiorly throughout the length of the streamer to impart neutral buoyancy thereto when immersed within the water.

The sleeve or casing 27 is fitted with a pair of end plates 34 and 35 respectively disposed within the end portions thereof and retained in position by a plurality of screws 36 which may also advantageously be employed to secure the ears 29 to the casing.

Each of the plates 34–35 is provided with a plurality of apertures 37 to allow the oil to completely fill the casing 27, and a central bore 38 to receive and retain a bearing member 39 which, as illustrated, may be a ball bearing. The motion sensing unit 10 is fitted within a support 41 and clamped securely thereto by screw 42 as illustrated.

A pair of bearing shafts 43 and 44 are fitted in mutually aligned relation within the support 41 and secured thereto by the screws 45, FIG. 3. The outer end of the shafts are fitted within the ball bearings 39. The support 41 is provided with an aperture within which the motion sensing unit 10 is arranged and securely clamped as by the screw 42 such that the center of gravity of the unit 10 lies below the axis of rotation of the support and the unit, therefore, is maintained in a substantially vertical position as viewed in FIG. 2 while the streamer section is being towed within the water.

Shaft 44 is somewhat longer than shaft 43 and carries for rotation therewith a pair of slip rings or discs 46 and 47 insulated therefrom and engaged by brushes 48 and 49 respectively connected to terminals 51 and 52. Slip discs 46 and 47 are connected electrically to terminals 22 by short lengths of conductor as is well known in the electrical art.

An arrangement is thus provided for establishing an external electrical connection to the coil winding 19 regardless of rotative or oscillatory movement of the particle velocity detector about the axis of rotation thereof.

The signal wires extending throughout the length of the detector streamer may be grouped about the particle velocity detectors in any convenient manner, preferably in a somewhat symmetrical arrangement between the ears 29. When employed within a flexible oil filled streamer for underwater seismic surveying operation, the device of FIG. 2 is responsive to and senses particle velocity of the surrounding medium corresponding to seismic wave signals moving both upwardly and downwardly and generates an electrical output in accordance with the character and direction of movement of the signals.

On FIG. 6 is shown an acoustically insensitive motionally responsive phone unit generally designated by the numeral 53 employing the same motion sensing unit 10 as the acoustically sensitive particle velocity unit of FIG. 2 but differing therefrom in the construction of the outer tubular casing 27. Whereas, it will be recalled, the casing 27 of the acoustically sensitive unit of FIG. 2 was provided with a plurality of perforations 28 for allowing free wave movement in either vertical direction of the liquid transmitting medium within which the device is immersed corresponding in both magnitude and character to the particle velocity of an acoustic wave sensed by the device, the outer tubular casing of the motionally responsive device 53 is not perforated but, on the other hand, it is provided with an outer cylindrical acoustic shield 54 extending throughout the length of the casing in such a manner as to form an air filled chamber therebetween effective to cause reflection of an acoustic wave and thus prevent the acoustic wave from actuating the dome shaped member 17 and coil 19 connected thereto. The general construction of this acoustic shield member is shown on FIGS. 6 through 9 of the drawings. Although the acoustic shield encloses a chamber filled with air, it is to be understood that, if desired, noise absorbing material suitable for this purpose may be employed, as is well known in the acoustic art, to insulate the motion sensing mechanism from acoustic waves impinging on the outer cylindrical surface of the shield. The device thus is responsive only to unwanted signals due to motional disturbances to the same degree as the acoustic particle velocity detector of FIG. 2, and non-responsive to an acoustic wave.

The motional responsive devices are equal in number to the acoustic detectors and mounted within the detector streamer such that each motional responsive device is in closely spaced adjacency to a different acoustic detector and connected in series opposition thereto as shown on FIG. 10.

This arrangement provides a cancellation of the electrical signals generated by the particle velocity detectors in response to motional disturbances resulting from residual inertia effects and thus electrical signals corresponding thereto are excluded from the seismic output signals received from the detector streamer by apparatus on the towing vessel. These motional responsive detector devices 53 are herein referred to, for the foregoing reasons, as noise canceling detectors or phones.

Referring now to FIG. 8 there is shown thereon an alternative arrangement in which the particle velocity detector and noise canceling detectors are mounted side-by-side on a single support 55 pivoted for rotative or oscillatory movement as heretofore described in regard to the support block 41. The coils of the motion sensing units 10 are series connected in opposition to the slip discs and thence to the pair of output terminals by the brushes and conductors illustrated. The end plates 34 and 35 are fitted within the end portions of an elongated casing or sleeve 56 and secured thereto and to ears 29 by a plurality of screws whereby the device is supported by the strain cables 31. The casing is provided with a plurality of apertures extending circumferentially thereabout opposite the particle velocity detector and an outer acoustic shield 54 about the noise canceling detector 53 which effectively prevents actuation of the dome member 17 of the noise canceling detector by an acoustic wave.

On FIG. 10 is shown in schematic form a circuit arrangement suitable for use with the present invention, the circuit including a transformer 57 having a primary winding 58 and a secondary winding 59. The primary winding is connected to a resistance 61 and the pressure responsive detectors P within the streamer section 32, all in parallel, the resistance being employed to smooth out the signal. One end of the secondary winding is connected to one conductor of the output circuit of the streamer and the other end of the winding is connected to the pairs of particle velocity detectors V and noise canceling detectors NC, all in series, from whence the circuit continues to the other conductor of the output circuit. The velocity and noise canceling detectors comprising a pair are connected together reversely, as shown in the circuit such that like signals generated by each of the detectors of the pair are canceled. In certain cases in which the noise cancellation feature is unnecessary or not desired, the noise canceling detectors may be omitted and the secondary winding of the transformer, therefore, would be connected in series with the particle velocity detectors only.

Whereas the acoustic particle velocity detector of the present invention has been described with particular reference to a system employing elongated flexible oil filled streamers of neutral buoyancy and having a plurality of pressure sensing transducers as pickup units therein for sensing underwater seismic signals as the streamer is towed at different depths within the water, one such system, for example, being disclosed in Patent 2,465,696, issued March 29, 1949, to Le Roy C. Paslay for Method and Means for Surveying Geological Formations, it is equally suitable for use with the system entitled Water Borne Means for Making Seismic Surveys disclosed in Patent 2,729,300 to L. C. Paslay et al., issued January 3, 1956, in which the streamer is towed along the bottom. Furthermore, by reason of the relatively high inertia of the unsprung magnetic structure and low mechanical impedance of the moving coil mechanism which actuates the coil selectively in opposite directions at the particle velocity of the surrounding medium, the transducer of the present invention is well adapted to other uses and purposes in which it is desired to record an acoustic signal transmitted through a fluid medium.

It will be obvious, therefore, to those skilled in the art to which the invention pertains, after understanding the invention, that various changes and modifications may be made and various instrumentalities may be employed without departing from the spirit and scope of the invention and it is our intention, therefore, in the appended claims to cover all such changes, modifications and instrumentalities.

What we claim as new and desire to secure by Letters Patent of the United States is:

1. A noise compensating device in combination with an acoustic particle velocity detector disposed within a neutrally buoyant oil filled flexible streamer having a plurality of strain cables therein and adapted to be towed beneath the surface of the water for making underwater surveys of subaqueous geological structures, the noise compensating device and particle velocity detector each having substantially identical elements comprising
   (1) an unsprung structure of high mechanical impedance including
   (2) an annular permanent magnet having upper and lower pole pieces secured thereto and forming a cylindrical magnetic air gap therebetween, and
   (3) a sprung structure of relatively low impedance and yieldably supported by said unsprung structure and carrying a coil winding for movement in either of two opposite directions within said air gap, said sprung structure including
   (4) a thin rigid dome member yieldably supported adjacent to and in alignment with said air gap for movement by the oil at the particle velocity thereof,
   (5) the noise compensating device being electrically connected to the particle velocity detector in opposition whereby identical simultaneous movements of the coil of each of the devices due to common motional disturbances simultaneously generates equal and opposing voltages,
   (6) a perforated casing enclosing the particle velocity detector for rendering the particle velocity detector responsive to particle velocity of the oil within which the device is submerged, and
   (7) an acoustic shield encircling the noise compensating device for rendering the noise compensating device unresponsive to particle velocity of the oil.

2. The combination of claim 1 in which the noise compensating device and particle velocity detector are both carried by
   (1) a common mounting and provided with
   (2) gimbal structure connected to said mounting and supported by the strain cables for maintaining both devices vertical when the streamer is towed through the water.

3. The combination of claim 2 in which the noise compensating device and particle velocity detector are each provided with a thin rigid dome member having both surfaces thereof directly exposed to acoustic waves for movement in each of two opposite directions by the oil at the particle velocity of the oil in contact therewith as the oil moves at the particle velocity of the acoustic wave.

4. A noise compensating device in combination with an acoustic particle velocity detector according to claim 1 in which (1) said upper and lower pole pieces are secured to the upper and lower end portions of said annular permanent magnet respectively and the annular space within said lower pole piece is sufficiently large to prevent substantial impedance to an acoustic wave passing therethrough, and (2) the thin rigid dome member is of a size substantially equal to the diameter of said air gap and both surfaces thereof are directly exposed to acoustic waves for movement in each of said opposite directions by the oil in contact therewith at the particle velocity of an acoustic wave impinging thereon.

5. A noise compensating device for a particle velocity acoustic transducer connected serially thereto in opposition, said device being constructed and arranged to generate like electrical signals respectively corresponding to like movements of the transducer and comprising (1) a unsprung annular magnet of high mechanical impedance having pole pieces respectively secured to the ends thereof forming an annular air gap therebetween, (2) means including a thin dome member secured to one of said pole pieces yieldably supporting a wire coil for movement in either direction within said air gap in response to motional disturbance of the device, (3) means for supporting said device in a vertical position in closely spaced adjacency to the particle velocity acoustic transducer and parallel therewith within an elongated flexible oil filled streamer adapted to be towed beneath the surface of a body of water, and (4) an acoustic shield encircling the device for preventing actuation of said dome member in response to an acoustic wave impinging upon the device whereby said wave is effective to actuate only the particle velocity detector.

6. A noise compensating device for a particle velocity acoustic transducer according to claim 5 in which both the noise compensating device and the particle velocity transducer each comprises (1) a thin dome member having both surfaces thereof directly exposed to acoustic waves and moveable thereby at the particle velocity of the waves in each of two opposite directions selectively in accordance with the direction and particle velocity of an acoustic wave impinging thereon, and (2) the other of said pole pieces is provided with a circular aperture of sufficient size to prevent substantial impedance to an acoustic wave passing therethrough.

References Cited by the Examiner

UNITED STATES PATENTS

| | | | |
|---|---|---|---|
| 1,847,702 | 3/1932 | Thuras. | |
| 2,465,696 | 3/1949 | Paslay | 181—.5 |
| 2,590,530 | 3/1952 | Groenendyke | 340—7 |
| 2,717,369 | 9/1955 | Bardeen et al. | 340—17 |
| 2,740,946 | 4/1956 | Geneslay | 340—17 |
| 2,783,449 | 2/1957 | Loofburrow | 340—17 |

SAMUEL FEINBERG, *Primary Examiner.*

BENJAMIN A. BORCHELT, *Examiner.*

P. A. SHANLEY, *Assistant Examiner.*